US006827044B2

(12) United States Patent
Lobanoff et al.

(10) Patent No.: US 6,827,044 B2
(45) Date of Patent: Dec. 7, 2004

(54) ANIMAL RESTRAINT SYSTEM FOR VEHICLES

(75) Inventors: Mark Lobanoff, Troy, MI (US); Ronald S. Gulette, Farmington Hills, MI (US)

(73) Assignee: BOS Automotive Products, Inc., Rochester Hills, MI (US)

( * ) Notice: Subject to any disclaimer, the term of this patent is extended or adjusted under 35 U.S.C. 154(b) by 21 days.

(21) Appl. No.: 10/254,182

(22) Filed: Sep. 25, 2002

(65) Prior Publication Data

US 2003/0150400 A1 Aug. 14, 2003

Related U.S. Application Data

(63) Continuation-in-part of application No. 10/072,943, filed on Feb. 13, 2002, now Pat. No. 6,637,377.

(51) Int. Cl.[7] .............................................. A01K 27/00
(52) U.S. Cl. ........................ 119/771; 119/792; 119/856
(58) Field of Search ............................... 119/769, 770, 119/771, 792, 850, 856, 857, 907; 54/79.1, 79.2

(56) References Cited

U.S. PATENT DOCUMENTS

| 623,596 | A | 4/1899 | Covington |
|---|---|---|---|
| 1,906,043 | A | 4/1933 | Bernstein |
| 3,189,003 | A | 6/1965 | Canfield |
| 3,590,783 | A | 7/1971 | Purgett |
| 3,722,478 | A | 3/1973 | Smith |
| 4,292,932 | A | 10/1981 | Wooderson |
| 4,537,154 | A | * 8/1985 | Kay ............................ 119/857 |
| 4,597,359 | A | 7/1986 | Moorman |
| 5,479,892 | A | 1/1996 | Edwards |
| 5,613,467 | A | 3/1997 | Arakawa |
| 5,724,920 | A | 3/1998 | Meisman et al. |
| 5,813,367 | A | 9/1998 | O'Brien |
| 5,893,339 | A | 4/1999 | Liu |
| 5,894,817 | A | * 4/1999 | Manuel ....................... 119/497 |
| 6,101,979 | A | 8/2000 | Wilson et al. |
| 6,164,245 | A | 12/2000 | Johnson |
| 6,637,377 | B2 | * 10/2003 | Lobanoff et al. ........... 119/792 |

FOREIGN PATENT DOCUMENTS

| FR | 2233931 | 6/1973 |
|---|---|---|
| WO | WO 92/02128 | 2/1992 |
| WO | WO 98/29281 | 7/1998 |

OTHER PUBLICATIONS

Allsafe Hunde–Sicherheitsgurt.
CanineAuto.com.
Four Paws, Pet Safety Sitter.
Four Paws, Safety Seat Vest Harness.
Roadie brochure page.

* cited by examiner

Primary Examiner—Robert P. Swiatek
(74) Attorney, Agent, or Firm—Harness, Dickey & Pierce, P.L.C.

(57) ABSTRACT

An animal restraint system for a vehicle has a vest having leg holes for front legs of an animal. A top strap is extended across the top of an animal wearing the vest and is looped through a buckle tongue and a webbing adjuster defining top and bottom portions of the top strap. The vest is secured to a seat belt of a vehicle by passing the seat belt between the top and bottom portions of the top strap. The top portion of the top strap can be pulled through the webbing adjuster to shorten the bottom portion to adjust the top strap. In an embodiment, the top strap is rotatably coupled to the vest.

25 Claims, 7 Drawing Sheets

ANIMAL RESTRAINT SYSTEM FOR VEHICLES

CROSS-REFERENCE TO RELATED APPLICATIONS

This application is a continuation-in-part of U.S. patent application Ser. No. 10/072,943 filed on Feb. 13, 2002, now U.S. Pat. No. 6,637,377 B2.

FIELD OF THE INVENTION

The present invention relates to animal restraints, and more particularly, to animal restraint systems for vehicles.

BACKGROUND OF THE INVENTION

Animals (particularly pets) are often transported in the passenger compartment of vehicles. If the animal is unrestrained, this presents a danger to both the animal and the human occupants of the vehicle. An unrestrained animal can interfere with the driver of the vehicle, such as by jumping on the driver's lap. Also, in the event that vehicle brakes suddenly, makes a sudden maneuver, or comes to a sudden stop such as in the case of an accident, the unrestrained animal may be thrown about the passenger compartment of the vehicle. This can injure the animal. It can also injure a human occupant if the animal is thrown into this occupant with enough force. It can also cause the driver to lose control of the vehicle if the animal is thrown into the driver when the driver is attempting to bring the vehicle to a stop or maneuvering the vehicle.

It is an object of this invention to provide an animal restraint system for a vehicle that restrains the animal from moving about the passenger compartment of the vehicle and also restrains the animal from being thrown about the passenger compartment of the vehicle if the vehicle suddenly brakes, maneuvers or stops.

SUMMARY OF THE INVENTION

An animal restraint system for a vehicle has a vest having leg holes for front legs of an animal. A top strap extends across the top of an animal wearing the vest and is looped through a buckle tongue and a webbing adjuster defining top and bottom portions of the top strap. The vest is secured to a seat belt of a vehicle by passing the seat belt between the top and bottom portions of the top strap. The top portion of the top strap can be pulled through the webbing adjuster to shorten the bottom portion to adjust the top strap. In an embodiment, the top strap is rotatably coupled to the vest.

In an aspect of the invention, a buckle attachment clip is secured to a buckle that mates with the buckle tongue and looped through a ring secured to one side of the vest and a webbing adjuster attachment clip is secured to the webbing adjuster and looped through a ring secured to the other side of the vest. This rotatably couples the top strap to the vest.

In another aspect of the invention, a buckle attachment strap is secured to a buckle that mates with the buckle tongue and looped around an attachment strap that is roped and secured to one side of the vest jacket. A webbing adjuster attachment strap is secured to the webbing adjuster and looped around a second attachment strap secured to the other side of the vest. This rotatably couples the top strap to the vest.

In an aspect of the invention, the animal restraint system has two top straps. The top straps are coupled to a first side of the vest jacket above one of the leg holes by individual buckles and to a second side of the vest jacket above the other leg hole by individual webbing adjusters.

In an aspect of the invention, the top and bottom portions of the top strap are secured together adjacent the buckle tongue to have a predetermined breakaway force.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
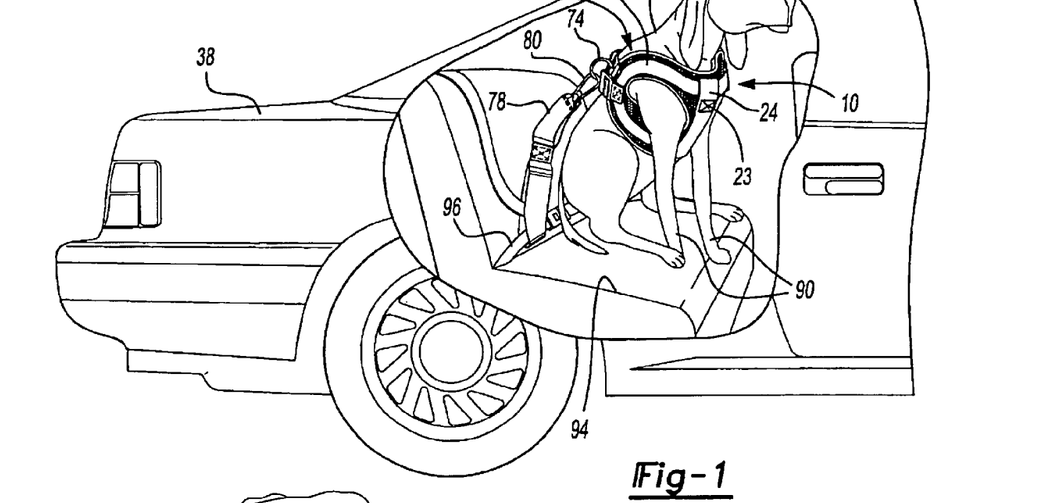
FIG. 1 is a perspective view of an animal restraint system in accordance with an aspect of the invention.
Figure 2:
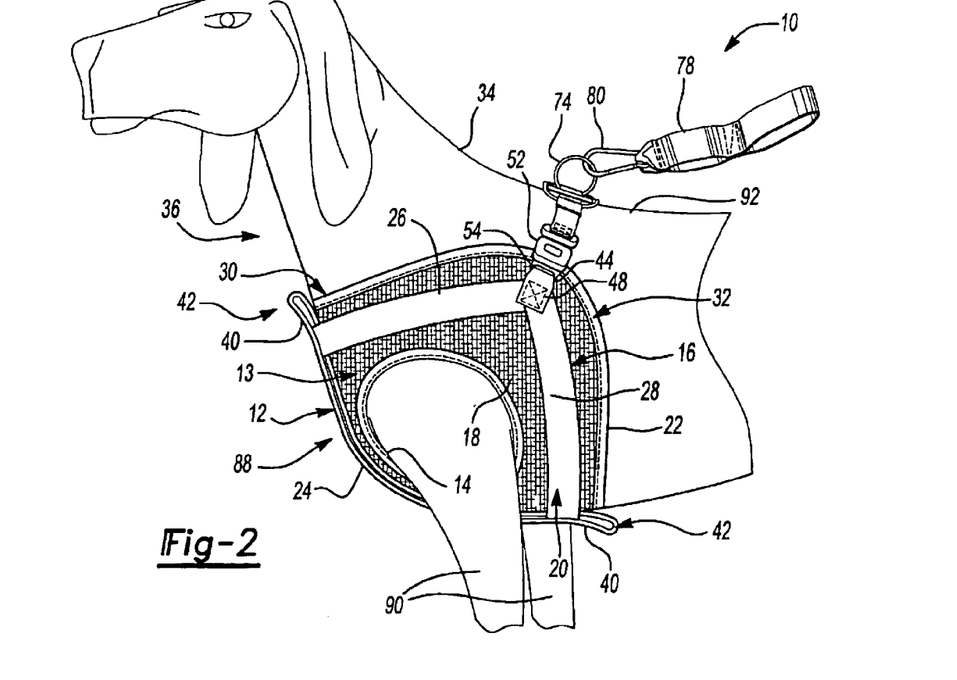
FIG. 2 is a side view of the animal restraint system of FIG. 1.
Figure 3:
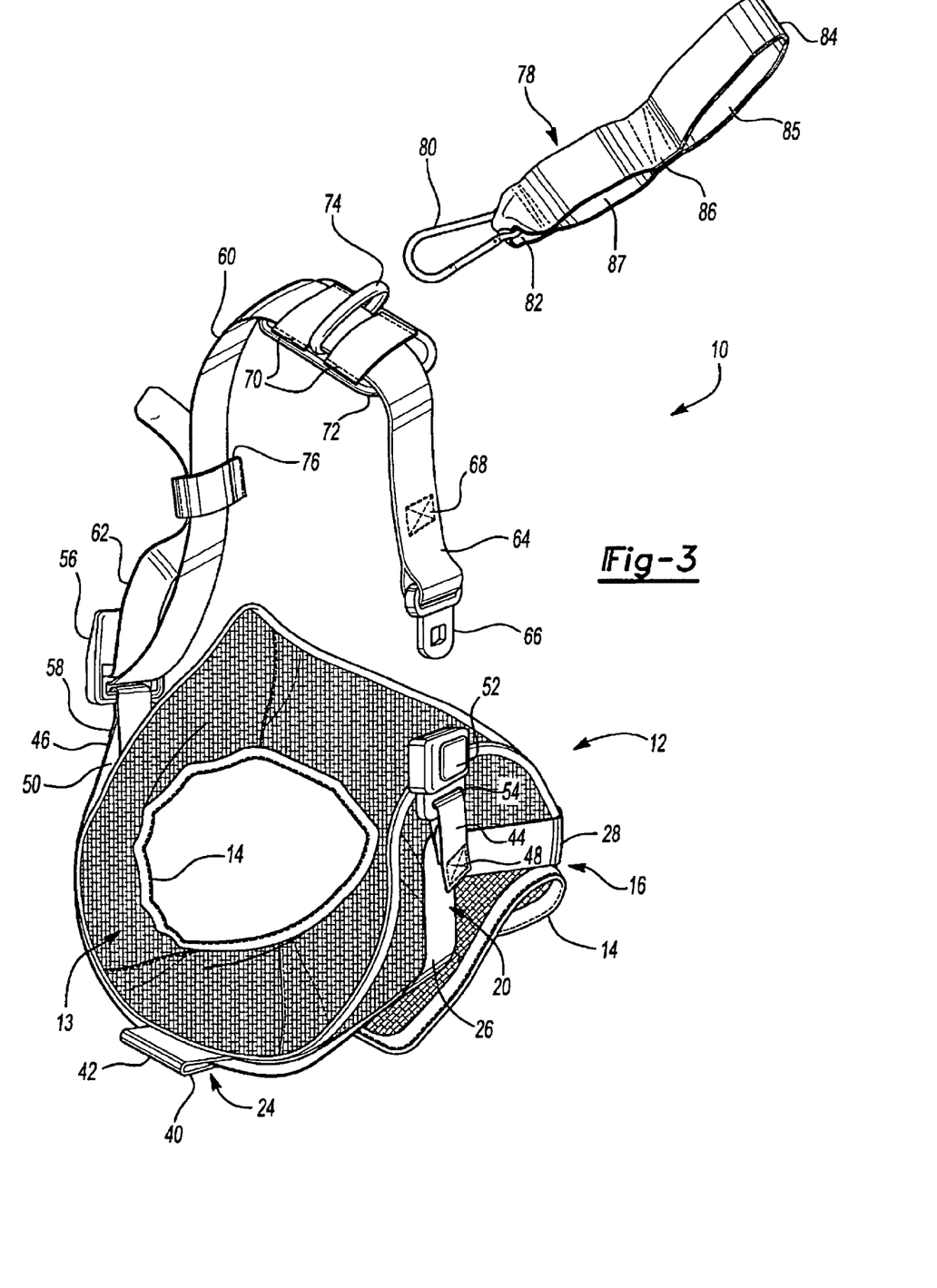
FIG. 3 is another perspective view of the animal restraint system of FIG. 1.

FIGS. 1–3 show an animal restraint system 10 for vehicles in accordance with the invention. Animal restraint system 10 includes a vest 12 having leg holes 14 for front legs 90 of animal 34. Vest 12 is symmetrical about leg holes 14. Illustratively, vest 12 is spherical in shape, that is, has a spherical radius, to provide this symmetry. Vest 12 includes a vest jacket 13 with reinforcing straps 16 secured to an outer side 18. Reinforcing straps 16 include peripheral strap 20 extending around vest jacket 13 adjacent a periphery 22 of vest jacket 13 and a chest strap 24 extending between leg holes 14.

Peripheral strap 20 illustratively includes a first strap 26 extending around a first side 30 of vest jacket 13 adjacent periphery 22 and a second strap 28 extending around a second side 32 of vest jacket 13 near periphery 22. As oriented in FIG. 2, first side 30 of vest jacket 13 is a front side of vest jacket 13 and second side 32 of vest jacket 13 is a rear side of vest jacket 13. As mentioned, however, vest 12 is symmetrical about leg holes 14 and can be placed on animal 34 with either first side 30 or second side 32 of vest jacket 13 at a front 36 of animal 34.

First and second straps 26, 28 of peripheral strap meet above each leg hole 14 and are stitched together and to vest jacket 13 thereat. It should be understood that other means of securement can be used, such as rivets. Chest strap 24 extends across vest jacket 13 between leg holes 14 from first strap 26 of peripheral strap 20 to second strap 28 of peripheral strap 20. Chest strap 24 and first and second straps 26, 28 of peripheral strap 20 are stitched together and to vest jacket 13 where they meet. Although peripheral strap 20 and chest strap 24 are illustratively secured to vest jacket 13 and to each other by stitching, it should be understood that other means of securing peripheral strap 20 and chest strap 24 to each other and to vest jacket 13 can be utilized, such as rivets.

Vest jacket 13 is illustratively made of a nylon netting and reinforcing straps 16 illustratively made of a polyester webbing of the type used in vehicle restraint systems. Vest jacket 13 and reinforcing straps 16 are sized to withstand the forces generated by sudden braking, maneuvering or stopping of a vehicle, such as vehicle 38.

One of the areas of maximum force during sudden braking, maneuvering or stopping of vehicle 38 is chest 88 of animal 34. Chest strap 24 is thus illustratively a strap that is doubled back on itself to comprise a double strap so that loops 40 are formed at opposed ends 42 of chest strap 24. The ends of the this strap are secured to each other at 23, such as by stitching. Other means of securement can be used, such as rivets. Peripheral strap 20 extends through loops 40 and is secured to chest strap 24 and vest jacket 13 thereat, such as by stitching. Other means of securement can be used, such as rivets. Although vest 12 has been described in the context of a vest jacket with reinforcing straps 16, it should be understood that vest 12 could comprise reinforcing straps 16 without vest jacket 13, with reinforcing straps 16 symmetrical about leg holes 14.

Attachment straps 44, 46 are secured at respective ends 48, 50, respectively to vest jacket 13 and peripheral strap 20 where first and second straps 26, 28 of peripheral strap 20 join together above leg holes 14. Attachment straps 44, 46 are illustratively secured to vest jacket 13 and peripheral strap 20 by stitching, although other means of securement can be used, such as rivets.

Attachment strap 44 has a buckle 52 secured to an end loop 54 of attachment strap 44. Illustratively, attachment strap 44 loops through buckle 52 and is secured to itself, by stitching, riveting, or other securement means, to secure buckle 52 to second end 54 of attachment strap 44. Attachment strap 46 has a strap length adjuster 56 secured to an end loop 58 of attachment strap 46. Buckle 52 is illustratively a buckle of the type used in vehicle restraint systems, such as seat belts or child car seats, and strap length adjuster 56 is a strap length adjuster of the type used in vehicle restraint systems.

Animal restraint system 10 also includes a top strap 60. A first end 62 of top strap 60 is looped through strap length adjuster 56 to secure first end 62 of top strap 60 to strap length adjuster 56. First end 62 of top strap 60 can be pulled through strap length adjuster 56 in conventional fashion to adjust the length of top strap 60 that extends over animal 34. Top strap 60 has a second end 64 looped through a tongue 66 and secured to top strap 60 at 68, such as by stitching. Other means of securement could be used, such as rivets. Top strap 60 is illustratively made of a polyester webbing of the type used in vehicle restraint systems and is sized to withstand the forces generated by sudden braking, maneuvering or stopping of a vehicle, such as vehicle 34.

Top strap 60 passes through strap loops 70 of a pad 72 and an attachment loop 74 to slidably secure attachment loop 74 and pad 72 to top strap 60. Attachment loop 74 is disposed between strap loops 70 of pad 72. Top strap 60 also passes through a strap holder 76, which is illustratively two pieces of webbing stitched together so that strap holder 76 slides on top strap 60. First end 62 can be placed in strap holder 76 to hold it in place. Attachment loop 74 is made of material sufficiently strong to withstand the forces generated by sudden braking, maneuvering or stopping of a vehicle. Attachment loop 74 is illustratively made of steel, although it can be made of other materials.

Animal restraint system 10 includes a tether strap 78 to secure vest 12 to vehicle 38. Tether strap 78 has a clip 80 secured at a first end 82, illustratively, by looping tether strap 78 through clip 80. Tether strap 78 is illustratively a length of webbing looped back on itself twice to provide a quadruple thick strap which is secured together adjacent first end 82 and at a middle 86 of tether strap 78, such as by stitching. Other means of securement can be used, such as rivets. Tether strap 78 thus has a loop 85 at a second end 84 and a loop 87 between first end 82 and middle 86. Tether strap 78 is illustratively made of a polyester webbing of the type used in vehicle restraint systems and is sized to withstand the forces generated by sudden braking, maneuvering or stopping of a vehicle, such as vehicle 34.

As discussed below, seat belt 96 is inserted through loop 85 or loop 87 to secure tether strap 78 to seat belt 96. The two loops 85 and 87 allow for some adjustment in the length of tether strap 78 between vest 12 and seat belt 96, with the length of tether strap 78 between vest 12 and seat belt 96 being shorter when seat belt 96 is passed through loop 87 then when passed through loop 85. It should be understood that more loops can be provided in tether strap by securing together the webbing used for tether strap 78 at places in addition to middle 86 allowing for finer length adjustment. Clip 80 is made of material sufficiently strong to withstand the forces generated by sudden braking, maneuvering or stopping of a vehicle. Clip 80 is illustratively made of steel, although it can be made of other materials.

To use animal restraint system 10, vest 12 is placed over the chest 88 of animal 34 with front legs 90 of animal 34 extending through leg holes 14 of vest 12. Since vest 12 is symmetrical about leg holes 14, there is no true front or back. Vest 12 can thus be rotated 180 degrees front to back and placed on animal 34 in either orientation. The user of animal restraint system 10 thus need not determine the front or back of animal restraint system 10 when placing animal restraint system 10 on animal 34, which simplifies doing so.

After vest 12 is placed on animal 34, top strap 60 is brought over the back 92 of animal 38 and tongue 66 inserted into buckle 52. If this is the first time animal restraint system 10 is placed on animal 34, the length of top strap 60 is adjusted with adjuster strap length adjuster 56.

After animal restraint system 10 is placed on animal 34, animal 34 is placed on the rear seat 94 of vehicle 38. Seat belt 96, which illustratively includes a lap belt and shoulder belt, is inserted through loop 85 or loop 87 of tether strap 78, buckled and snugged. Clip 80 of tether strap 78 is clipped to attachment loop 74 of top strap 60, securing animal restraint system in vehicle 38.

Clip 80 of tether strap 78 can be unclipped from attachment loop 74 of top strap 60 to allow easy removal of animal 34 from vehicle 38. A leash (not shown) can be clipped to attachment loop 74. Alternatively, seat belt 96 can be unbuckled and tether strap 78 removed to allow removal of animal 34 from vehicle 38 and tether strap 78 can then be used as a leash.

Buckle 52 can also be unbuckled, allowing animal 34 to step out of vest 12. In this regard, animal restraint system 10 is left coupled to seat belt 96. Animal restraint system 10 can then be easily and rapidly secured to animal 34 by placing the front legs 90 of animal 34 through leg holes 14 of vest jacket 12 and inserting tongue 66 of top strap 60 into buckle 52.

Figure 4:
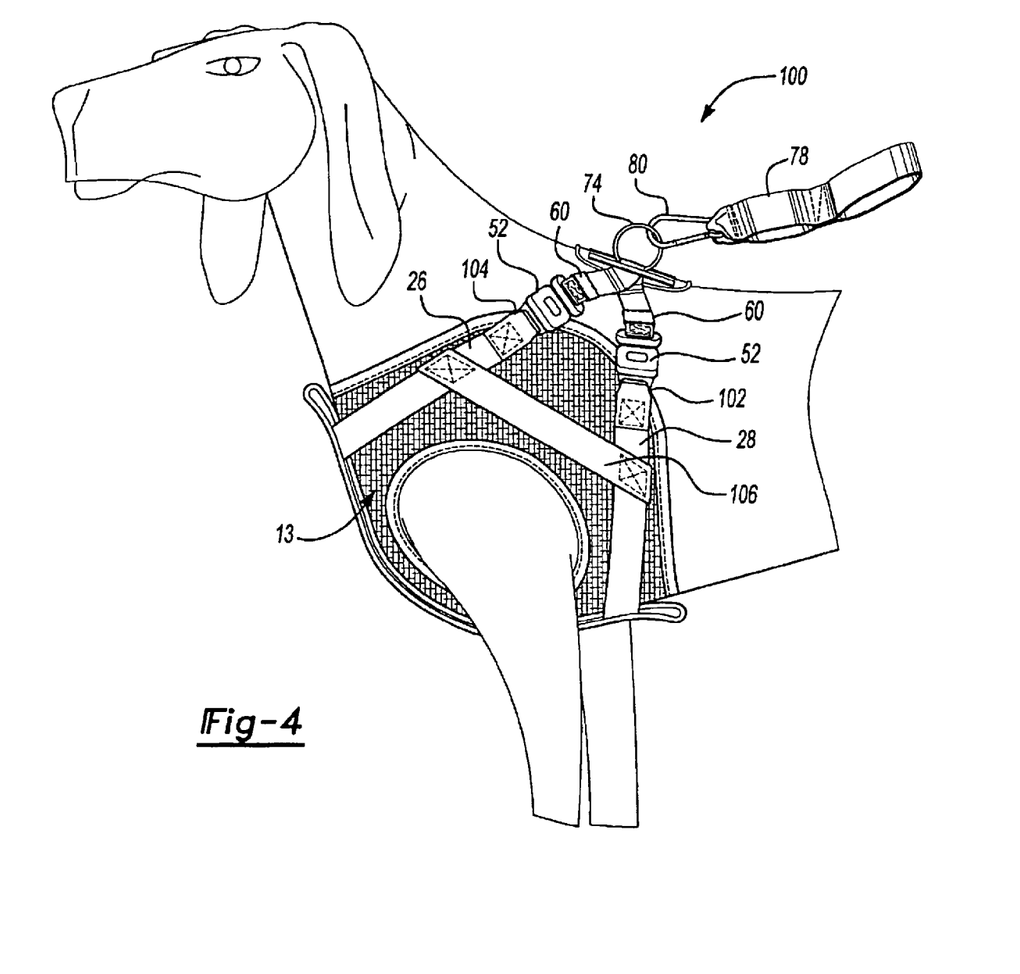
FIG. 4 is a side view of an animal restraint system in accordance with an aspect of the invention.
Figure 5:
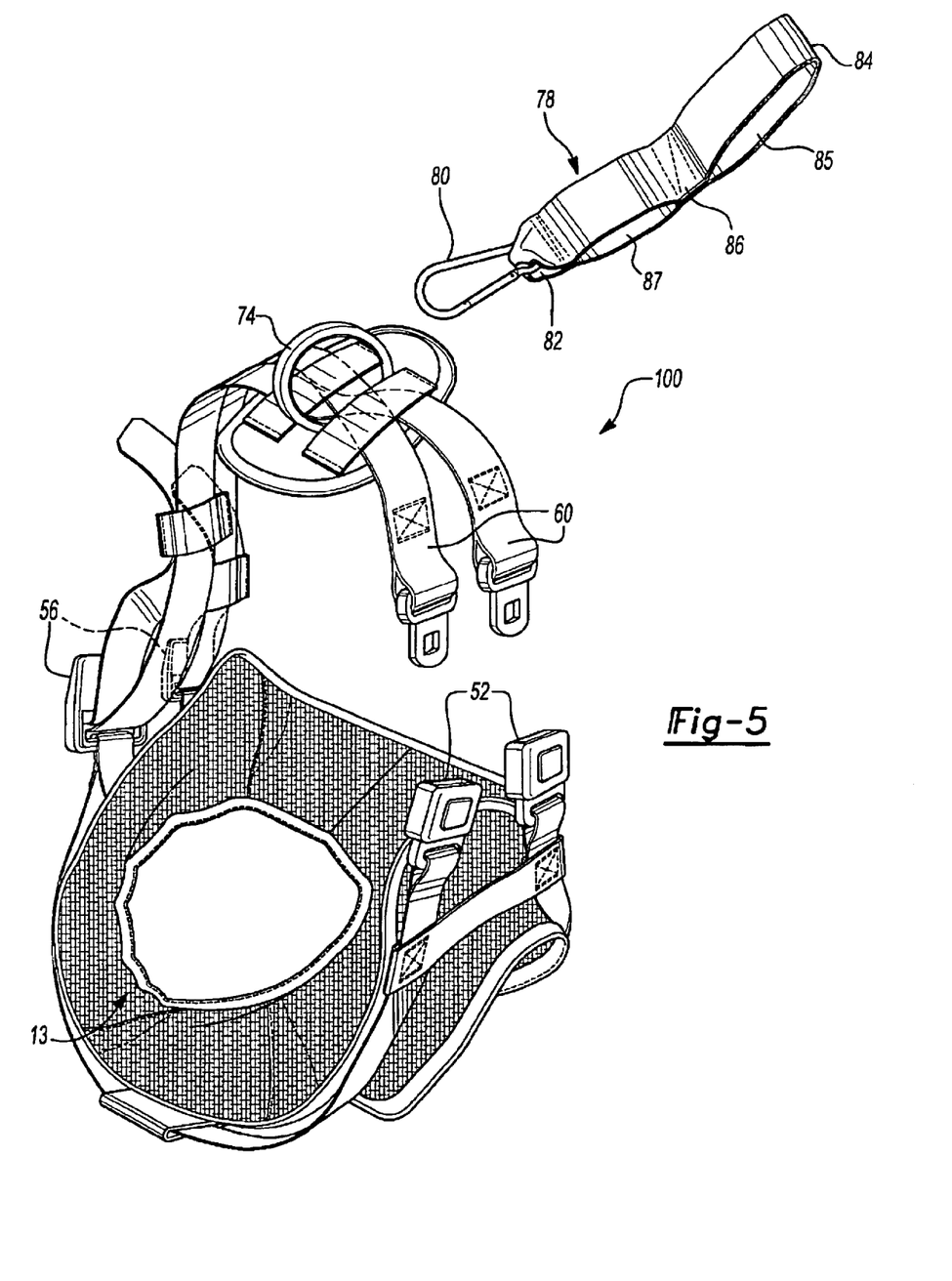
FIG. 5 is a perspective view of the animal restraint system of FIG. 4.

FIGS. 4 and 5 show an animal restraint system 100 for larger animals. Animal restraint system 100 is a variation of animal restraint system 10 and only the differences will be discussed. Like elements will be identified with the same reference numbers.

The main difference between animal restraint system 100 and animal restraint system 10 is that animal restraint system 100 has a four point harness system whereas animal restraint system 10 has a two point harness system. In this regard, top strap 60 of animal restraint system 100 is attached to vest jacket 13 and reinforcing straps 16 by two buckles 52 and two strap length adjusters 56. Illustratively, animal restraint system 100 has two top straps 60, with each top strap 60 passing through attachment loop 74. First strap 26 and second strap 28 of peripheral strap 20 of vest 12 are illustratively secured to outer side 18 of vest jacket 13 at separate points above leg holes 14, with buckles 52 secured to ends 102, 104 of first and second straps 26, 28, respectively. Attachment straps 44, 46 may thus be dispensed with. Similarly, strap length adjusters 56 are secured to the ends of first and second straps 26, 28 on the opposite side of vest jacket 13. The foregoing arrangement comprises the four point harness system.

Reinforcing straps 16 of vest 12 of animal restraint system 100 may include reinforcement straps 106 on opposite sides of vest jacket 13 (only one side being shown in FIG. 4) extending between first and second straps 26, 28 above leg holes 14. Reinforcement straps 106 are illustratively secured to first and second straps 26, 28 and vest jacket 13 by stitching. Other securement means can be used, such as rivets. Reinforcement straps 106 are also illustratively made of polyester webbing of the type used in vehicle restraint systems.

Animal restraint systems 10 and 100 restrain the animal 34 from moving about the passenger compartment of vehicle 38. Animal restraint systems 10, 100 also restrain the animal 34 in the event of a sudden maneuver, sudden braking, or sudden stop of the vehicle 38 and prevent the animal 34 from being thrown around the passenger compartment of the vehicle 38.

Figure 6:
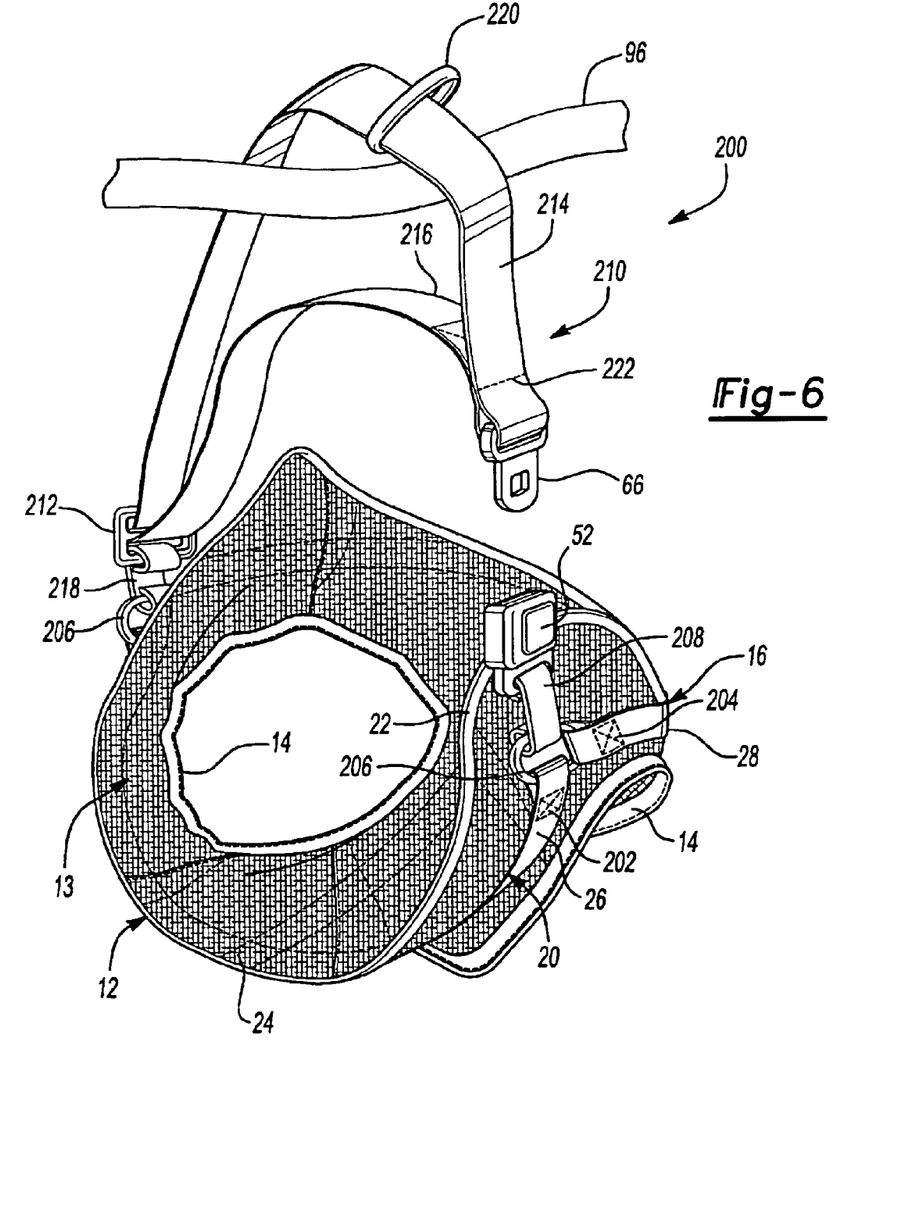
FIG. 6 is a perspective view of an animal restraint system in accordance with an aspect of the invention.

FIG. 6 shows another embodiment of the animal restraint system for vehicles of the present invention. Elements in animal restraint system 200 of FIG. 6 comparable to animal restraint system 10 of FIGS. 1–3 will be identified with the same reference numerals. The description of animal restraint system 200 will focus on the elements of animal restraint system 200 that are different from the elements of the animal restraint system 10 shown in FIGS. 1–3.

In animal restraint system 200, top strap 210 is rotatably secured to vest jacket 13. This allows vest jacket 13 and top strap 210 to rotate with respect to each other to provide a better fit of vest jacket 13 on animal 34, as discussed in more detail below.

In the embodiment of FIG. 6, top strap 210 is rotatably secured to vest jacket 13. In this regard, first and second straps 26, 28 of peripheral strap 20 are not stitched together above leg holes 14. Rather, ends 202, 204 of first and second straps 26, 28 are looped through rings 206 above each leg hole 14 and back on themselves where they are secured to their respective first and second strap 26, 28, such as by stitching, rivets or the like. Buckle 52 is rotatably secured to one of the rings 206 above one of the leg holes 14 by buckle attachment clip 208. Buckle attachment clip 208 is clipped around a portion of buckle 52 and ring 206 and secured to itself, such as by crimping its ends.

Top strap 210 is a continuous loop that loops through tongue 66 and a webbing adjuster 212, thus having a top portion 214 and a bottom portion 216, as oriented in FIG. 6. Top and bottom portions 214, 216 of top strap 210 are secured together adjacent tongue 66 at 222 such as by stitching, riveting or the like. Top and bottom portions 214, 216 are secured together adjacent tongue 66 at 222 so that they will breakaway from each other at a predetermined force, discussed in more detail below. Tongue 66 mates with buckle 52 as described above. Top portion 216 also passes through a D-ring 220 that provides a ring to which a leash can be attached.

Webbing adjuster 212 is rotatably secured to ring 206 above leg hole 14 by webbing adjuster attachment clip 218 on the side of vest jacket 13 opposite the side on which buckle 52 is attached to vest jacket 13. Webbing adjuster attachment clip 218 clips around a portion of webbing adjuster 212 and ring 206 and is secured to itself, such as by crimping its ends, to rotatably secure webbing adjuster 212 to vest jacket 13. In this regard, vest jacket 13 is rotatably attached to top strap 210 in the manner described above.

Rings 206 are illustratively elongated steel rings sized to withstand the force generated by a sudden stop or impact by the size of animal for which the animal restraint system 200 is intended to be used. Attachment clips 208, 218 are illustratively steel clips also sized to withstand the force generated by a sudden stop or impact by the size of animal for which the animal restraint system 200 is intended to be used. In this regard, it should be understood that while attachment clips 208, 218 can be used advantageously for smaller animals, larger animals may require a different way of attaching buckle 52 and webbing adjuster 212 to rings 206, such as described with reference to FIG. 7.

Animal 34 is placed in animal restraint system 200 in a manner similar to that described above. Top strap 210 is brought over the back of animal 34 and tongue 66 mated with buckle 52. Top portion 214 of top strap 210 is pulled upwardly to tighten top strap 210. Pulling top portion 214 upwardly pulls bottom portion 216 through webbing adjuster 212, shortening bottom portion 216 and lengthening top portion 214. Shortening bottom portion 216 tightens top strap 210 around animal 34. Webbing adjuster 212, illustratively available from Indiana Mills of Westfield, Ind., works in known fashion and keeps top portion 214 from being pulled through webbing adjuster 212 unless bottom portion 216 is pulled at an angle with respect to webbing adjuster 212, generally, a perpendicular angle.

Rings 206 rotatably secure top strap 210 to vest jacket 13 and allow top strap 210 and vest jacket 13 to rotate with respect to each other when vest jacket 13 is placed on animal 34. This allows vest jacket 13 to be oriented on animal 34 so that it more closely conforms to the contours of the body of animal 34, particularly, the neck and chest of animal 34. In the animal restraint system 10 shown in FIGS. 1–3, it was found that particularly with smaller animals, there would be a gap between the front of vest jacket 13 and the neck of animal 34 that sometimes would allow animal 34 to pull its legs out of vest jacket 13. Being able to rotate vest jacket 13 and top strap 210 with respect to each other to more closely conform vest jacket 13 to the contours of the body of animal 34 permits vest jacket 13 to be more closely fitted on animal 34, making it more difficult for animal 34 to get out of vest jacket 13.

Elongated rings 206 permit buckle attachment clip 208 and webbing adjuster attachment clip 218 to slide therein.

Buckle attachment clip 208 and webbing adjuster attachment clip 218 permit buckle 52 and webbing adjuster 212 to be secured closer to rings 206 than the attachment straps of FIGS. 1–5, 7 and 8, reducing the circumference around vest jacket 13 and top strap 210. This permits animal restraint system 200 to be more closely fitted on smaller animals, thus making it more difficult for the smaller animal to escape from animal restraint system 200.

To secure vest 12 of animal restraint system 200 to vehicle 38 (FIG. 1), seat belt 96 of vehicle 38 is passed through top strap 210 between top and bottom portions 214, 216. Top strap 210 will now bear the forces caused by a sudden stop or impact as opposed to ring 74 of the animal restraint system 10 shown in FIGS. 1–5. It was found that ring 74 had to be fairly large to withstand the forces generated by a sudden stop or impact. Having seat belt 96 loop through top strap 210 to secure animal restraint system 200 to vehicle 38 eliminates the need to have a bulky ring, as well as the need for tether strap 78.

As mentioned above, top and bottom portions 214, 216 of top strap 210 are secured together at 222 adjacent tongue 66 so that they will break away from each other at a predetermined breakaway force. In the event of a sudden stop or impact, seat belt 96 will pull on top portion 214, which may pull bottom portion 216 through webbing adjuster 212 shortening bottom portion 216, thus tightening top strap 210 on animal 34. To avoid over tightening top strap 210 on animal 34, top portion 214 breaks away from bottom portion 216 at a predetermined breakaway force. Once top portion 214 breaks away from bottom portion 216, top strap 210 will slide through tongue 66 as well as webbing adjuster 212 resulting in the lengths of top and bottom portions 214, 216 being equal. This loosens top strap 210 on animal 34 and avoids undue tightening of top strap 210 on animal 34. The predetermined breakaway force is set based on the size of animal 34 with which animal restraint system 200 is intended for use. The smaller the animal, the lower the predetermined breakaway force.

The predetermined breakaway force can be varied in differing ways depending on how the top portion 214 and bottom portion 216 of top strap 210 are secured together adjacent tongue 66. For example, if top portion 214 is stitched to bottom portion 216, varying the size and type of thread, the number of stitches and the number of lines of stitches results in different predetermined breakway forces. Where top strap 210 is a webbing strap, stitching top portion 214 to bottom portion 216 at 222 with a size 90 nylon thread using a lock stitch of six stitches per inch and one line of stitches results in a predetermined breakaway force of about fifty pounds per inch. Illustratively, top strap 210 will be a two-inch wide webbing strap and two rows of stitches will be used, resulting in a breakaway force of about 200 pounds. If top portion 214 is secured to bottom portion 216 by rivets, the predetermined breakaway force can be varied by varying the size and number of rivets used.

Figure 7:
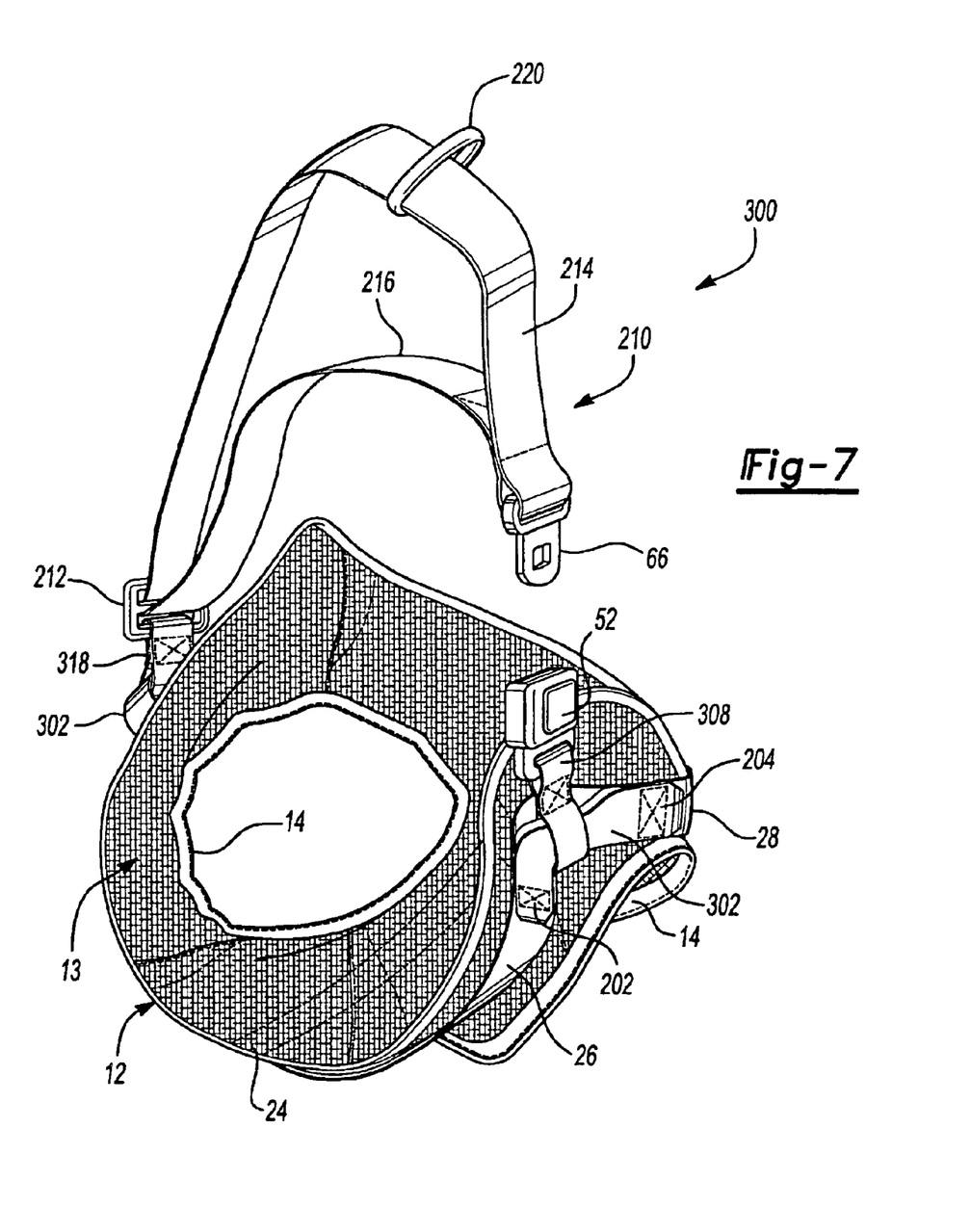
FIG. 7 is a perspective view of an animal restraint system in accordance with an aspect of the invention.

For larger animals, the size of rings 206 needed to withstand the force of a sudden impact or stop is fairly large. Animal restraint system 300 shown in FIG. 7 provides an alternative way of rotatably attaching top strap 210 to vest jacket 13 to avoid the use of large, bulky size rings 206.

Animal restraint system 300 is for the most part identical to animal restraint system 200 and only the differences will be described. Elements of animal restraint system 300 comparable to the elements of animal restraint system 200 or animal restraint system 10 will be identified with like reference numerals. It should be understood that the components of animal restraint system 300 would be sized for the size of animal 34 with which animal restraint system 300 is intended to be used and thus may be larger than the comparable components of animal restraint system 200.

Animal restraint system 300 uses attachment straps 302, illustratively, web straps that have been "roped," to rotatably attach top strap 210 to vest jacket 13. An attachment strap 302 is secured on either side of vest jacket 13 above leg holes 14. Each attachment strap 302 is secured at its ends to the ends 202, 204 of straps 26, 28 of peripheral strap 20, such as by stitching, riveting or the like. Each attachment strap 302 is "roped" or twisted one or more turns before being secured. An attachment strap 308 (which is looped through buckle 52) is looped around an attachment strap 302 on one side of vest jacket 13 and webbing adjuster attachment strap 318 (which is looped through webbing adjuster 212) is looped around the attachment strap 302 on the other side of vest jacket 13. Attachment straps 308 and 318 can thus slide back and forth on attachment straps 302 allowing top strap 210 and vest jacket 13 to rotate with respect to each other. This also allows the location where top strap 210 is secured to vest jacket 13 to translate with respect to vest jacket 13. That is, the location where top strap 210 is secured to vest jacket 13 can move front to back and back to front with respect to vest jacket 13. The distance of translation is determined by the length of attachment straps 302 extending across respective sides of vest jacket 13.

Figure 8:
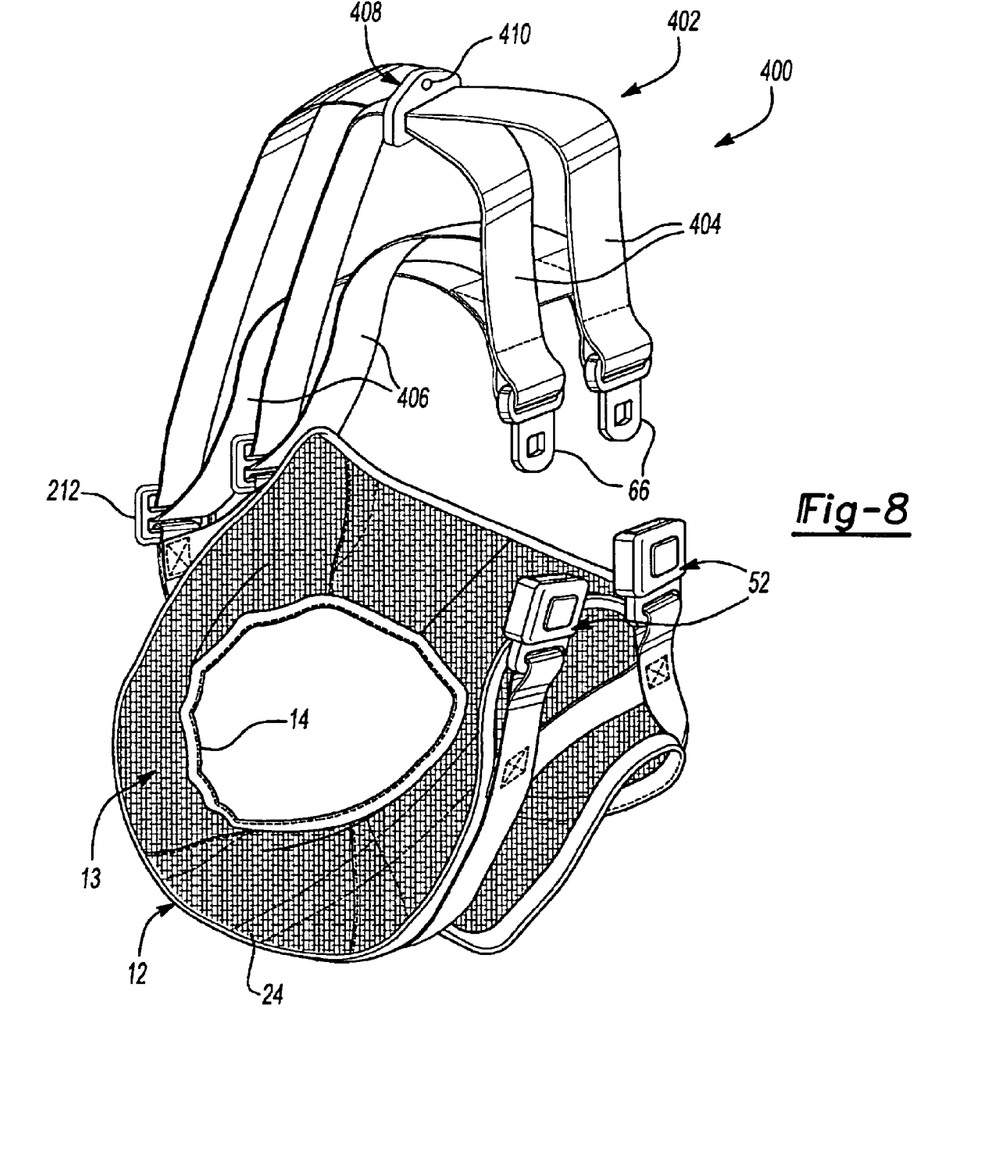
FIG. 8 is a perspective view of an animal restraint system in accordance with an aspect of the invention.

Turning to FIG. 8, animal restraint system 400, a variation of the animal restraint system 100 of FIG. 5 for yet larger animals is shown. Like elements will be identified with like reference numerals. Animal restraint system 400 has dual top straps 402 that pass through respective tongues 66 and webbing adjusters 212 in the same manner as top strap 210 of animal restraint systems 200, 300. The top portion 404 of each top strap 402 is secured to the bottom portion 406 of that top strap 402 adjacent a respective tongue 66 such as by stitching, riveting or the like. The top portion 404 of each top strap 402 is secured to the bottom portion 406 of the respective top strap 402 so that it breaks away at a predetermined force, as described above. Each top strap 402 is adjusted in the same manner described above with respect to top strap 210 of FIGS. 6 and 7. To prevent tangling, a slider/loop 408 is provided through which the top portions 404 of dual top straps 402 pass. Slider/loop 408 has a hole 410 therethrough to which a leash can be attached. The dual top straps 402 may be oriented so that they cross each other (as shown in FIG. 8) or run parallel to each other.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An animal restraint system for a vehicle, comprising a vest having a vest jacket including leg holes for front legs of an animal and a top strap that extends across a back of an animal wearing the vest from a first side of the vest jacket to a second side of the vest jacket when the vest jacket is on the animal to secure the vest to the animal, the top strap rotatably secured to the first and second sides of the vest jacket, the vest removably securable to a seat belt of the vehicle, the top strap including a continuous loop that is looped through a buckle tongue and a webbing adjuster defining top and bottom portions of the top strap extending between the buckle tongue and the webbing adjuster, the top and bottom portions secured together adjacent the buckle tongue, the vest removably securable to the seat belt by passing the seat belt between the top and bottom portions of the top strap.

2. The animal restraint system of claim 1 wherein the top strap is rotatably and removably secured to one side of the vest jacket.

3. The animal restraint system of claim 1 and further including the webbing adjuster rotatably secured to one side of the vest jacket and a buckle rotatably secured to the other side of the vest jacket that mates with the buckle tongue.

4. The animal restraint system of claim 3 and further including a buckle attachment clip secured to the buckle and a webbing adjuster attachment clip secured to the webbing adjuster, the buckle attachment clip and the webbing adjuster attachment strap looped through respective rings secured on opposite sides of the vest jacket to rotatably secure the top strap to the vest jacket.

5. The animal restraint system of claim 4, and further including reinforcing straps secured to the vest jacket, the rings secured to the vest jacket by the reinforcing straps looped through respective ones of the rings.

6. The animal restraint system of claim 1 wherein the vest is symmetrical about the leg holes.

7. The animal restraint system of claim 6 wherein the vest is spherical.

8. The animal restraint system of claim 1 wherein the bottom portion of the top strap is pullable through the webbing adjuster by pulling the top portion of the top strap to shorten the bottom portion of the top strap extending across the back of the animal with the webbing adjuster releasably securing the top strap to prevent the top portion of the top strap from being pulled back through the webbing adjuster.

9. The animal restraint system of claim 8 wherein the top portion and the bottom portion of the top strap are secured together adjacent the tongue to have a predetermined breakaway force.

10. The animal restraint system of claim 9 wherein the top and bottom portions of the top strap are secured together adjacent the tongue by stitches, the predetermined breakaway force determined by at least one of the size of thread, type of thread, type of stitches and number of stitches.

11. An animal restraint system for a vehicle, comprising a vest having a vest jacket including leg holes for front legs of an animal and a top strap that extends across a back of an animal wearing the vest from a first side of the vest jacket to a second side of the vest jacket when the vest jacket is on the animal to secure the vest to the animal, the vest removably securable to a seat belt of the vehicle, first and second attachment straps, each of the first and second attachment straps secured at opposed ends to the vest jacket on opposite sides of the vest jacket, the top strap slidably secured to the first and second attachment straps.

12. The animal restraint system of claim 11 and further including reinforcing straps secured to the vest jacket, the ends of the first and second attachment straps roped and secured to the reinforcing straps.

13. The animal restraint system of claim 12 wherein the vest is symmetrical about the leg holes.

14. The animal restraint system of claim 13 wherein the vest is spherical.

15. The animal restraint system of claim 11 and further including a buckle tongue secured to one side of the top strap and a webbing adjuster secured to an opposed side of the top strap, a buckle attachment strap secured to a buckle and looped around the first attachment strap and a webbing adjuster attachment strap secured to the webbing adjuster and looped around the second attachment strap wherein the buckle attachment strap and webbing adjuster attachment strap can slide between opposed ends of the first and second attachment straps allowing locations where the top strap is secured to the vest jacket to translate with respect to the vest jacket.

16. The animal restraint system of claim 11 wherein the top strap includes a continuous loop that is looped through a buckle tongue and a webbing adjuster defining top and bottom portions of the top strap extending between the buckle tongue and the webbing adjuster, the top and bottom portions secured together adjacent the buckle tongue to have a predetermined breakaway force.

17. The animal restraint system of claim 16 wherein the top and bottom portions of the top strap are secured together adjacent the tongue by stitches, the predetermined breakaway force determined by at least one of the size of thread, type of thread, type of stitches and number of stitches.

18. An animal restraint system for a vehicle, comprising:
a vest having a vest jacket including leg holes for front legs of animal;
a top strap that extends across a back of an animal wearing the vest from a first side of the vest jacket to a second side of the vest jacket to secure the vest to the animal, the top strap including a continuous loop that loops through a buckle tongue and a webbing adjuster defining top and bottom portions of the top strap extending between the buckle tongue and the webbing adjuster, the top and bottom portions of the top strap secured together adjacent the buckle tongue;
a buckle for mating with the buckle tongue, the buckle rotatably coupled to the first side of the vest jacket;
the webbing adjuster rotatably coupled to the second side of the vest jacket;
the top strap adjustable across a back of the animal by pulling the top portion of the top strap to pull the bottom portion of the top strap through the webbing adjuster to shorten the bottom portion, the webbing adjuster releasably securing the top strap to prevent the top portion of the top strap from being pulled through the webbing adjuster; and
the vest removably securable to a seat belt of the vehicle by passing the seat belt between the top and bottom portions of the top strap.

19. The animal restraint system of claim 18 and further including reinforcing straps secured to the vest jacket on both sides of the vest jacket, the reinforcing straps having ends looped through respective rings on the sides of the vest jacket, a buckle attachment clip secured to the buckle and a webbing adjuster attachment clip secured to the webbing adjuster, the buckle attachment clip looped through the ring on one side of the vest jacket and the webbing adjuster attachment strap looped through the ring on the second side of the vest jacket.

20. The animal restraint system of claim 19 wherein the top portion and the bottom portion of the top strap are secured together adjacent the tongue to have a predetermined breakaway force.

21. The animal restraint system of claim 18 and further including at least first and second attachment straps, each of the first and second attachment straps roped and secured at opposed ends on opposite sides of the vest jacket to reinforcing straps secured to the vest jacket, a buckle attachment strap secured to the buckle and looped around the first attachment strap and a webbing adjuster attachment strap secured to the webbing adjuster and looped around the second attachment strap.

22. The animal restraint system of claim 21 wherein the top portion and the bottom portion of the top strap are secured together adjacent the tongue to have a predetermined breakaway force.

23. The animal restraint system of claim 22 wherein the buckle attachment strap and webbing adjuster attachment strap can slide between opposed ends of the first and second attachment straps allowing a location where the top strap is secured to the vest jacket to translate with respect to the vest jacket.

24. An animal restraint system for a system for a vehicle, comprising a vest having a vest jacket including leg holes for front legs of an animal, at least two top straps, each top strap including a continuous loop that is of looped through a buckle tongue and a webbing adjuster defining top and bottom portions for each top strap, the top and bottom portions of each top strap secured together adjacent the buckle tongue through which that top strap is looped, the vest removably securable to a seat belt of the vehicle by passing the seat belt between the top and bottom portions of each top strap, the bottom portion of each top strap pullable through its respective webbing adjuster by pulling the top portion of its respective top strap to shorten the bottom portion of that top strap extending across the back of an animal wearing the vest, the webbing adjusters releasably securing the top strap to prevent the top portions of the top straps from being pulled through the webbing adjusters, and the top portion and bottom portion of each top strap secured together adjacent the tongue through which that top strap is looped to have a predetermined breakaway force.

25. The animal restraint system of claim 24 wherein the top and bottom portions of each top strap are secured together adjacent their respective tongue by stitches, the predetermined breakaway force determined by at least one of the size of thread, type of thread, type of stitches and number of stitches.

* * * * *